United States Patent [19]

Farrar

[11] Patent Number: 4,962,697
[45] Date of Patent: Oct. 16, 1990

[54] COMBINATION GRILLING AND SMOKING COOKER

[76] Inventor: Luther L. Farrar, 608 Green St., Auburn, Ala. 36830

[21] Appl. No.: 475,980

[22] Filed: Feb. 6, 1990

[51] Int. Cl.$^5$ .................. A47J 37/04; A47J 37/06
[52] U.S. Cl. ..................................... 99/340; 99/446; 99/448; 99/449; 99/482; 126/25 R; 126/9 B
[58] Field of Search ............... 99/339, 340, 342, 352, 99/419, 395, 444, 446, 448, 449, 450, 467, 482; 126/25 R, 9 R, 9 B

[56] References Cited

U.S. PATENT DOCUMENTS

| | | | |
|---|---|---|---|
| 848,018 | 3/1907 | Engelhard | 99/444 |
| 2,573,988 | 11/1951 | Saltzberg | 126/25 R |
| 2,842,043 | 7/1958 | Reuland | 126/25 R |
| 3,318,300 | 5/1967 | Witty | 126/25 B |
| 3,776,127 | 12/1973 | Muse | 99/482 |
| 4,094,295 | 6/1978 | Boswell et al. | 126/9 R |
| 4,300,444 | 11/1981 | Muse | 99/448 |
| 4,467,709 | 8/1984 | Anstedt | 126/9 B |
| 4,495,860 | 1/1985 | Hitch et al. | 99/340 |
| 4,512,249 | 4/1985 | Mentzel | 126/9 B |
| 4,587,947 | 5/1986 | Tomita | 126/25 R |

Primary Examiner—Timothy F. Simone
Attorney, Agent, or Firm—Cushman, Darby & Cushman

[57] ABSTRACT

The present invention comprises a pivotable cooker that can be used for smoking food in one position and grilling food in another position. The housing has two open ends and is pivotable about the middle section. When one open end is disposed on top, the grill is constructed so that smoking can take place. Pivoting the grill around the pivot point then allows the cooker to be used for grilling. The slidable components allow smoking and grilling to be performed immediately after the other without danger of burning and the outer housing is made of a plurality of sections that telescopically fit into each other so that a compact device results.

10 Claims, 6 Drawing Sheets

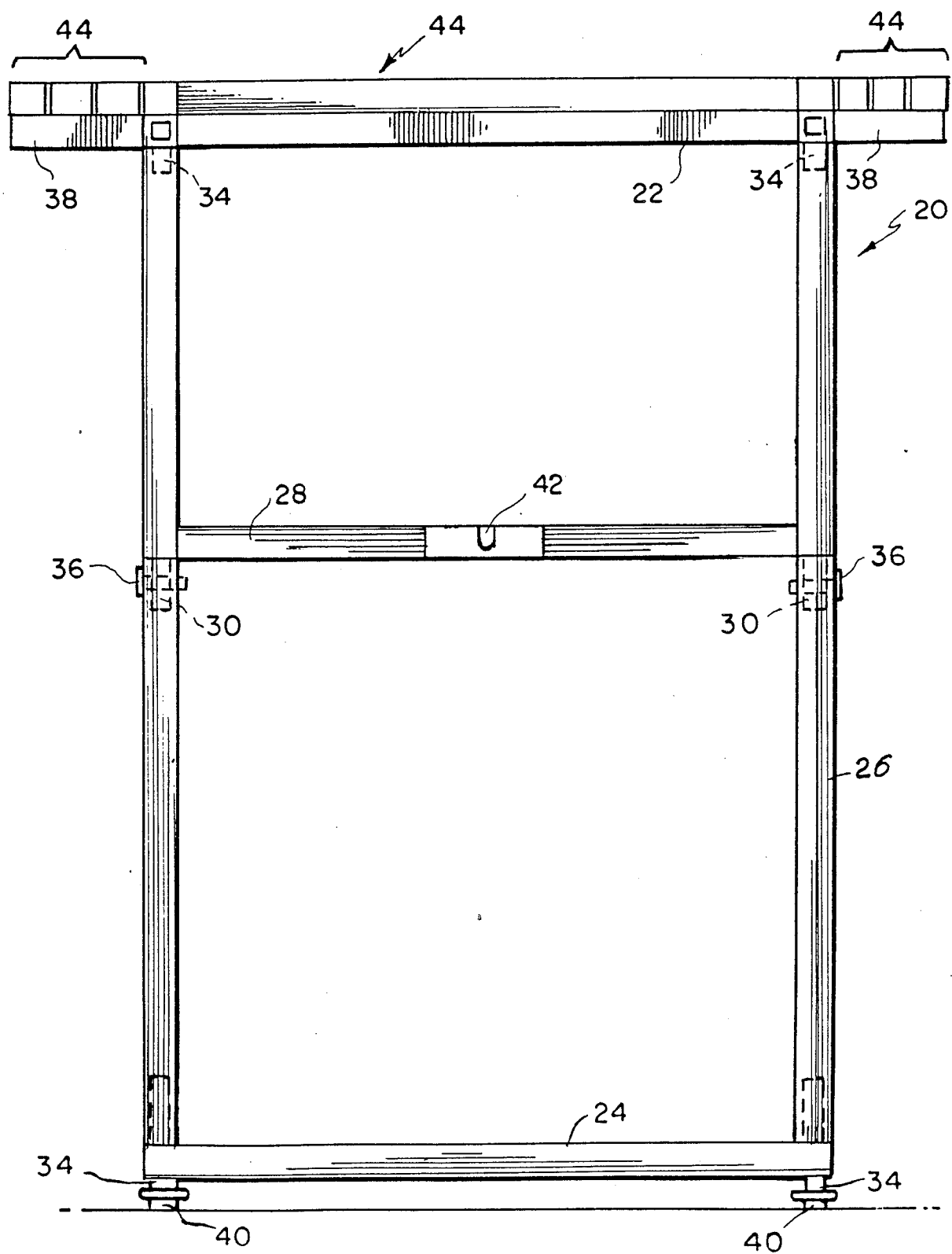

F. I G. 5

COMBINATION GRILLING AND SMOKING COOKER

BACKGROUND OF THE INVENTION

1. The Field of the Art

The present invention relates to a cooker that can both grill and smoke food. In a preferred embodiment, the cooker is pivotal so that in one position grilling of food takes place and, in another position, smoking of food takes place.

2. Brief Description of the Art

Various types of cookers are known that use a heating element such as charcoal briquets to smoke and grill food. For example, U.S. Pat. No. 4,094,295 to Boswell discloses a charcoal grill and smoker unit. In Boswell, charcoal is disposed in a bottom base pan. Disposed over the bottom base pan is a main body that holds a water pan and grills for holding food. Over the main body is a cover. In operation, when used as a smoker, the cylindrical main body is placed above the base pan holding the charcoal briquets. Smoke rises through the main cylinder to the food and slow cooking of the food by smoking is accomplished. When grilling food is desired, the main body is removed and a grill is placed directly on the base pan so that food can be grilled. Thus, both grilling and smoking are accomplished.

U.S. Pat. No. 4,587,947 to Tomita also discloses a compact portable grill apparatus. It illustrates a grill that can also be used as a wok.

U.S. Pat. No. 3,318,300 to Witty discloses a cooker with a pivotal feature that is used for extinguishing the charcoal or other heating element after cooking is finished. The charcoal is disposed on a grate located in the middle of a closed container. Sand is placed in the bottom of the container. After grilling is finished the container is completely closed and turned upside down. The sand and the charcoal briquets are mixed together and the charcoal extinguished. Once extinguished, the container is pivoted once more, the unused charcoal separates from the sand and the grill is then ready for use once more.

However, none of the prior art discloses or suggests a cooker than can be used to smoke food using a drip pan and grill food that is effective, compact and easy to clean.

SUMMARY OF THE INVENTION

It is an object of the present invention to provide a cooker than can both grill and smoke food effectively.

It is another object of the present invention to provide a compact cooker that can grill and smoke food and is also easy to clean.

The present invention provides a cooker that meets the above recited objects of the invention by providing a pivotable housing having two open ends. The housing pivots about a pivot point supported by a supporting frame. Depending on which end is displaced above the other end, either smoking or grilling can take place.

When used for smoking food, a supporting member supports the food toward the top of the housing, which is covered by a covered top, and the heating element is disposed substantially at the other end. A water pan is then disposed between the heating element and the supporting member for the food. A drip pan is also located beneath the heating element.

When the smoking of food occurs, the heating element is disposed an effective distance away from the food so that effective slow cooking using the smoke can occur.

When grilling of food is desired, the water pan is removed, the housing is pivoted about the pivot point so that the other end is on top, the drip pan is removed, and the grill is placed over the top open end. The heating element is then located near the grill so that effective grilling of food can occur.

Furthermore, the housing is formed of different sections that can fit together in a nested arrangement and disassembled for easy transport. When disassembled, these sections can easily be cleaned.

Thus, the above referenced invention provides a cooker that can grill and smoke food effectively and can also be made compact and be easily cleaned.

The cooker of the present invention can also be modified so that both boiling and steaming of food can take place. Each of these operations take place when the cooker is in the grilling position. Thus, other types of cooking can be utilized with the present invention.

BRIEF DESCRIPTION OF THE DRAWINGS

These and other advantages of the present invention may be appreciated from studying the following detailed description of the preferred embodiment together with the drawings in which:

FIG. 2 illustrates a side view of the supporting frame used in the preferred embodiment of the present invention.

DETAILED DESCRIPTION OF THE PREFERRED EMBODIMENT

Figure 1:
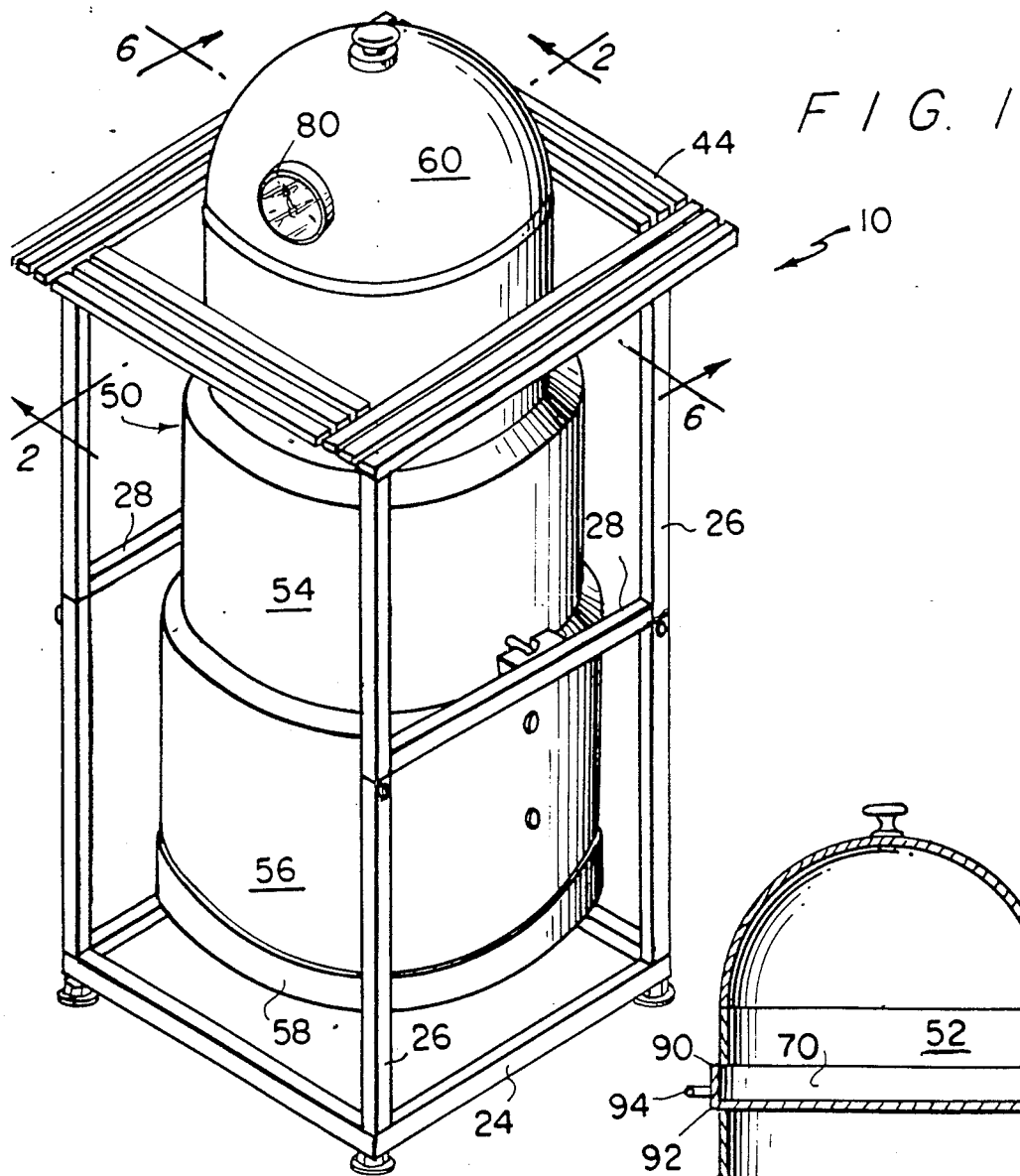
FIG. 1 illustrates a perspective view of the preferred embodiment of the present invention.

FIG. 1 illustrates a perspective view of the cooker 10 of the present invention. Each part of cooker 10 will now be described with reference to the following Figures.

FIG. 2 illustrates a side view of supporting frame 20 composed of a top supporting member 22, a bottom supporting member 24, four legs 26, and side braces 28 and 30. Each of the supporting members, legs and side braces, is preferably made of metal.

Figure 3:
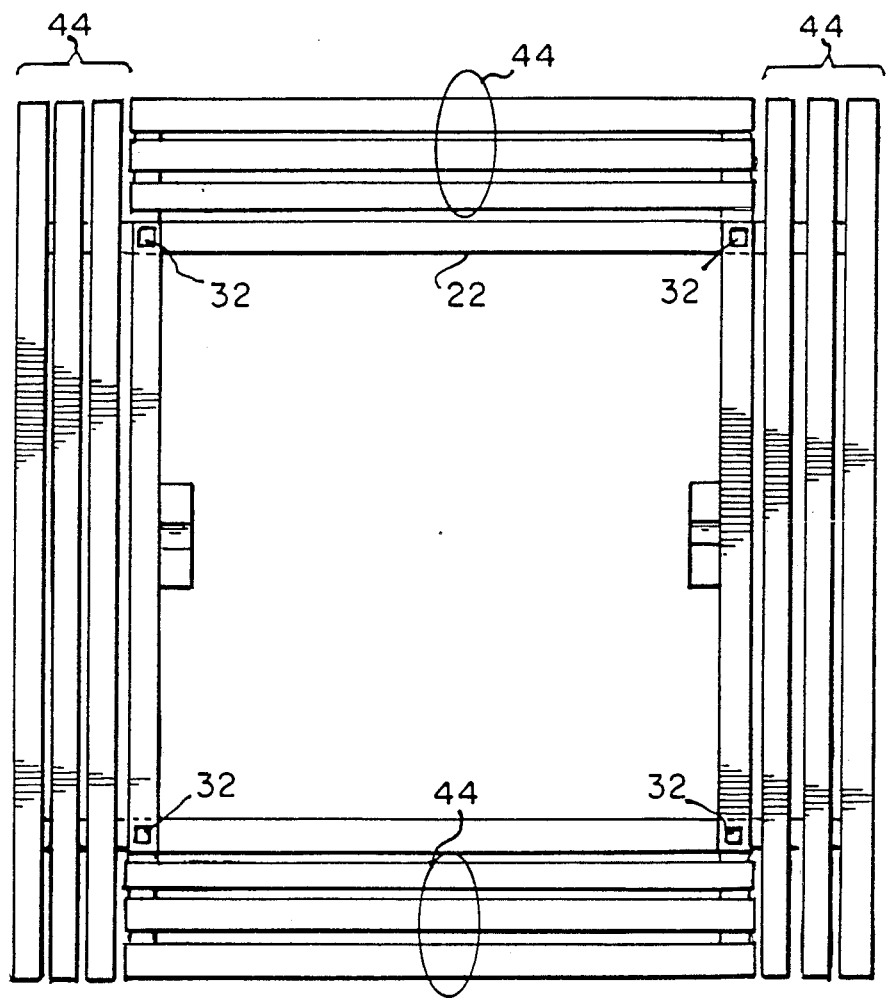
FIG. 3 illustrates a top view of the top supporting member of the supporting frame for the preferred embodiment of the preferred invention.

FIG. 3 illustrates in top plan view top supporting frame 20, which has four square holes 32 in supporting frame 20, one at each corner. Into each of these holes fits a peg 34. Each peg 34 fits through the hole 32 and then into one of the legs 26, which is formed of a hollow construction as shown in FIG. 2.

Figure 5:
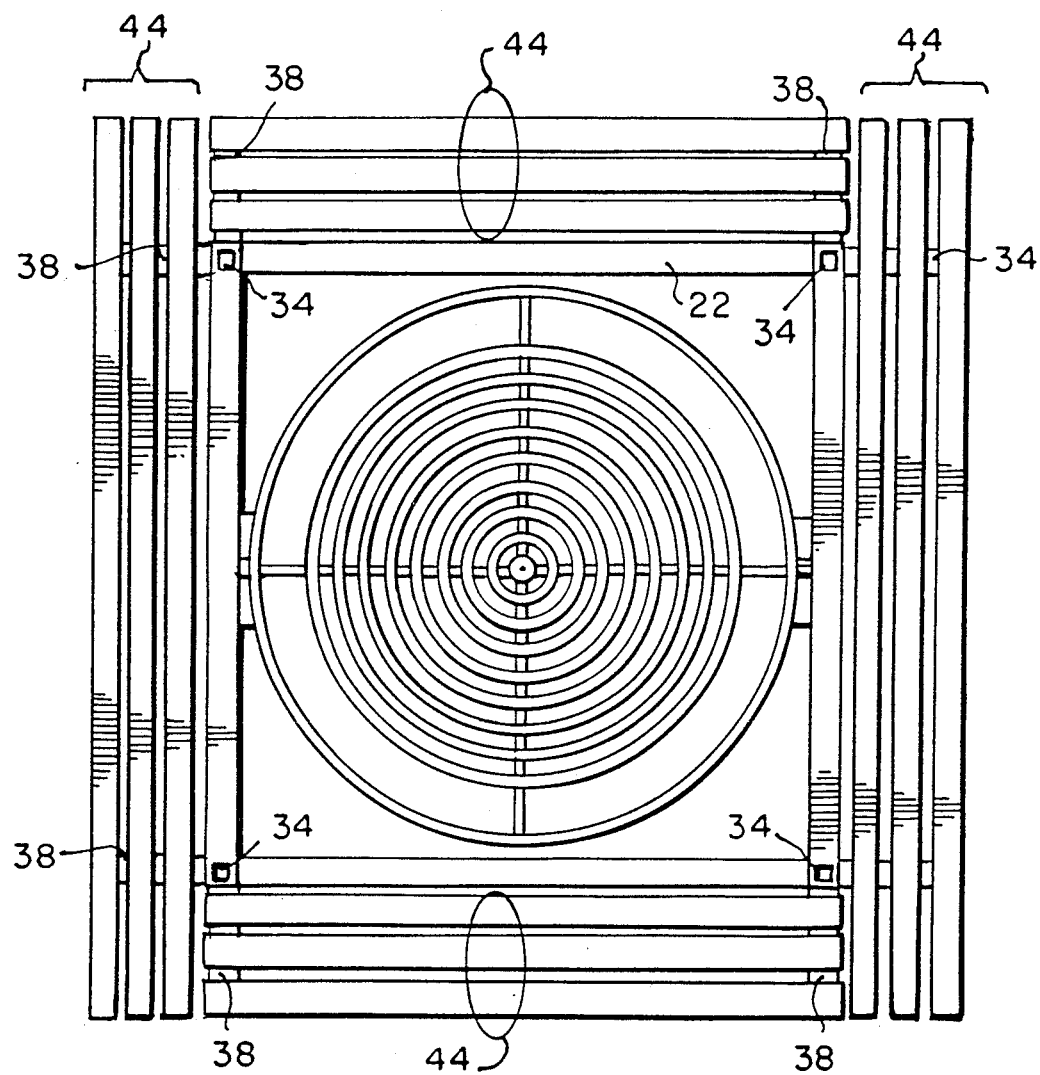
FIG. 5 illustrates a top view of the cooker in a grill position according to the preferred embodiment of the present invention with the cover removed.

FIG. 2 further illustrates that extension members 38 form part of the top supporting member 22. These extension members are used to support table sections 44, illustrated in FIG. 3. One table section exists on each side of top supporting member 22. Each of the table sections 44 are preferably a one piece assembly using a U shaped clasp to attach to the top supporting frame member 22. FIG. 5 shows the complete structure when cooker 10 is in the grilling position.

Figure 4:
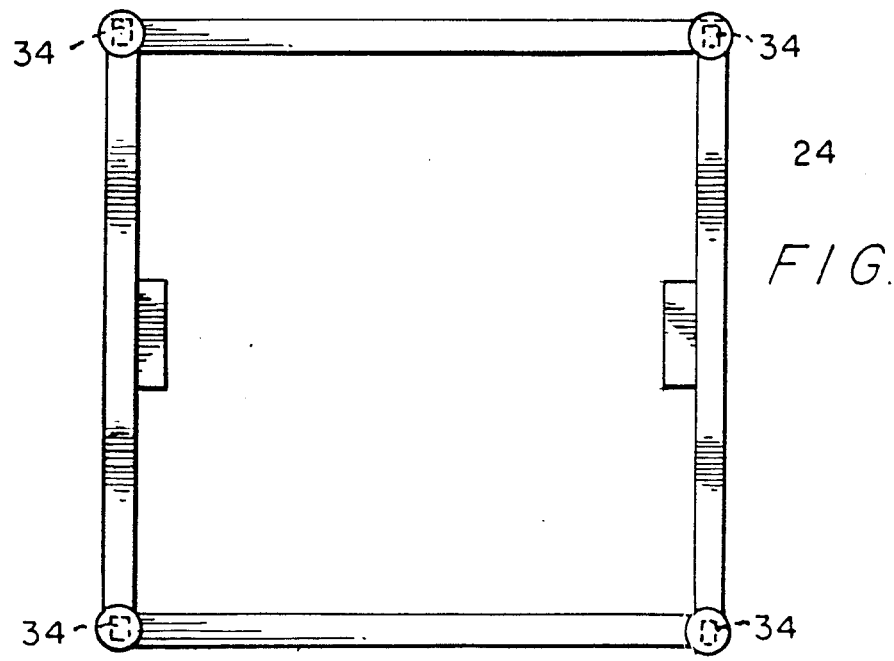
FIG. 4 illustrates a top view of the bottom supporting member for the supporting frame of the preferred embodiment of the preferred invention.

FIG. 4 illustrates a bottom view of bottom supporting member 24. Bottom supporting member 24 contains the same holes 34 in each of the corners to receive pegs 34. However, each of pegs 34 contain leveling feet 40 that are screwably adjustable with each of the pegs 34 for balancing supporting frame 20.

FIG. 2 further illustrates side braces 28 and 30. Side brace 28 contains a pivot hole 42, described hereinafter. Each side brace 28 can be welded to two of the legs 26 so that an "H" shaped structure results. Side braces 28 could also be attached to legs 26 using fasteners such as eye bolts if the supporting frame 20 is required to be even more compact. Each of the side braces 30 are preferably connected to legs 26 using fasteners 36, such as eye bolts. This type of fastening arrangement is used so that side braces 30 can be removed during the pivoting.

Figure 6:
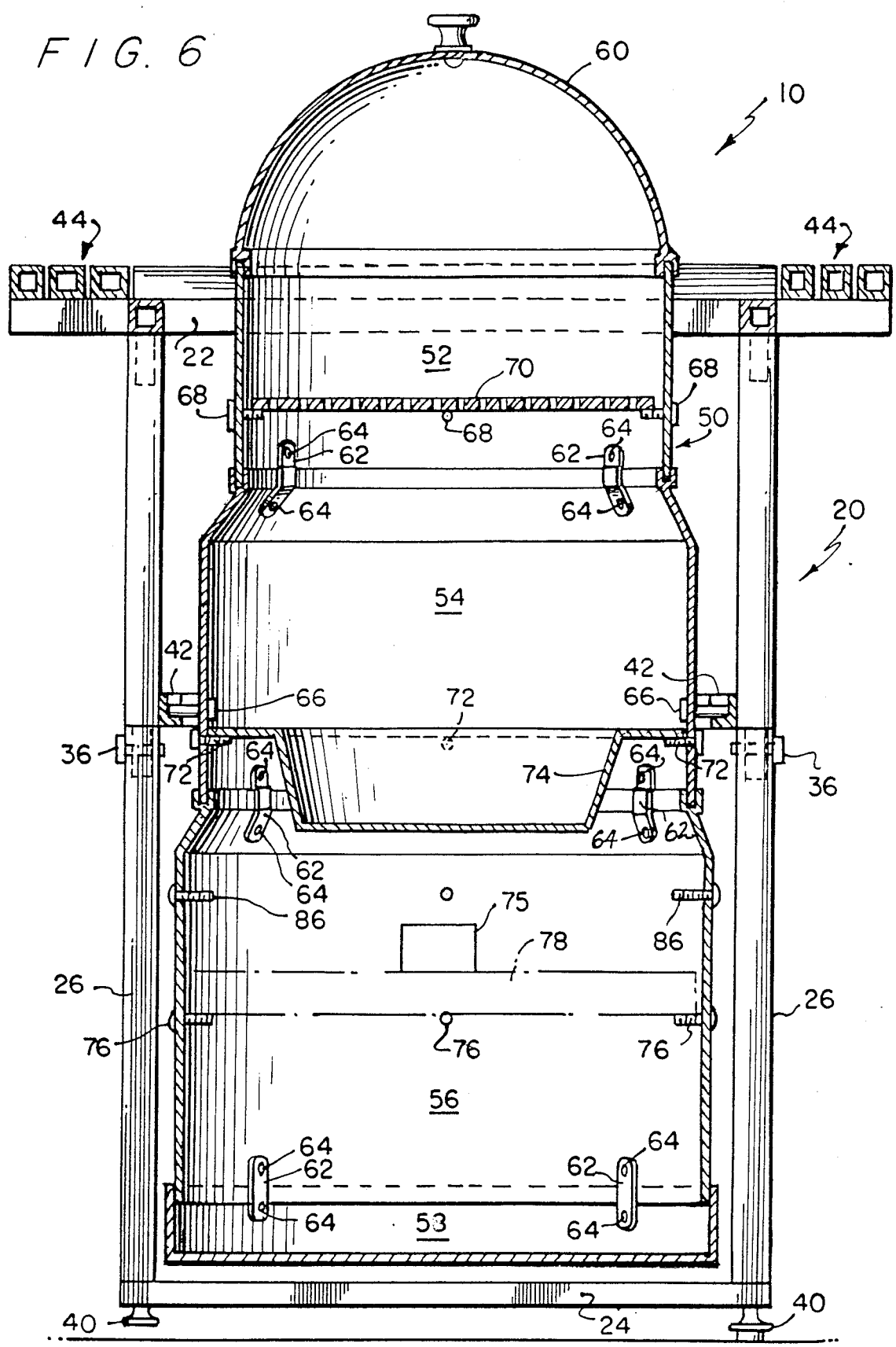
FIG. 6 illustrates a view along line 6—6 of FIG. 1 of the cooker in the position used to smoke food.

Cooker 10 is illustrated in FIG. 6 in the position used for smoking food. Section 52, middle section 54, and section 56 complete outer housing 50. Each of these sections are preferably made of metal, have a diameter of approximately 15 inches, and are each 10 inches deep. The sections are preferably cylindrical, but could be any shape. Furthermore, each of the sections are made to telescopically fit inside each other when disassembled. Thus, the diameter of section 56 is the largest and the diameters of sections 54 and 52 are progressively smaller.

In the arrangement used for smoking food, drip pan 58 is attached to the bottom of section 56 and cooker top 60 is placed over the top of section 52. Sections 52 and 54, sections 54 and 56, and section 56 and drip pan 58 are all connected using connecting plates 62, through which fit screw 64.

Pivot pins 66 fit through middle section 54 into pivot holes 42. This pivot assembly allows outer housing 50 of the cooker to be rotated about pivot pin 66 into the two different cooking positions.

In the position for smoking food, as illustrated in FIG. 6, support pins 68 are disposed in section 52 and support a grill 70 on which the food to be smoked is placed. Support pins 72, disposed in middle section 54, are similarly used to support a wine/water plate 74. Support pins 76 are then used to support a heating element 78. Heating element 78 can be charcoal briquets, a gas heating element, or an electric heating element. If charcoal briquets are used, element 78 need be only a support structure on which the charcoal briquets rest. However, heating element 78, if gas or electricity, could use gas or electric burners such as are known in the art.

FIG. 1 also illustrates cooking thermometer 80 as disposed in cooker top 60, which is used for providing an indication of the temperature of the cooker 50 when used for smoking.

While smoking food, the water/wine pan 74 is filled with water. Any appropriate wood is placed on a raised metal pan 75 (FIG. 6) over a portion of heating element so that the desired smoked flavor results. Heating element 78 ignites and the food to be cooked is placed on grill 70. The food can then be slowly cooked in the manner well known for smoking food.

Figure 7:
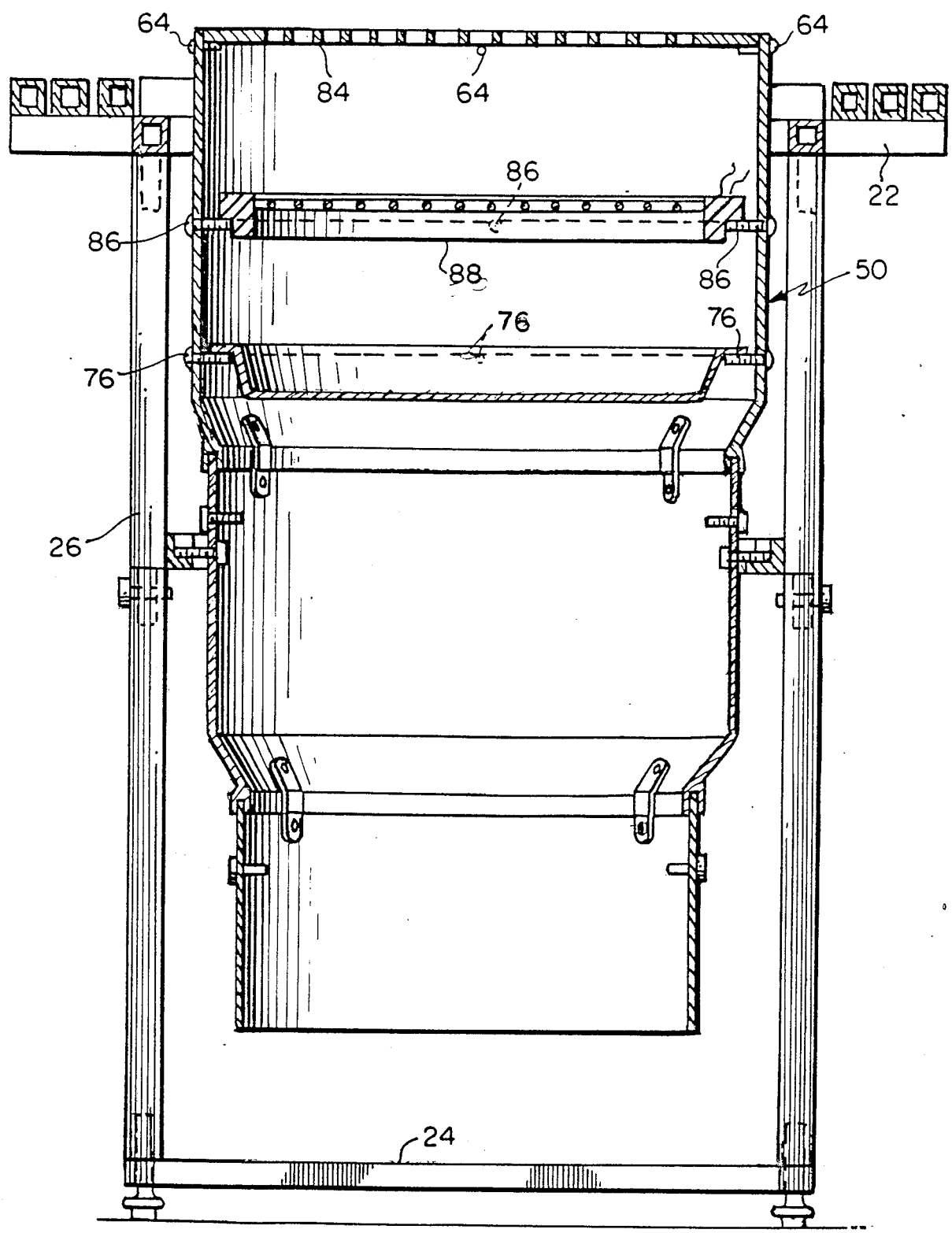
FIG. 7 illustrates a view of the cooker in a position used to grill food.

If, rather than smoking food, it is desired to grill food, housing 50 can be pivoted around pivot pins 66 so that section 56 is disposed on top. This position is illustrated in FIG. 7. Prior to pivoting the housing 50 from the position shown in FIG. 6 to the position shown in FIG. 7, drip pan 58, cooker top 60, and top supporting member 22 are removed. Also, water/wine pan 74 and heating element 78 are removed. The grill can then be flipped so that section 56 is disposed on top.

Figure 8:
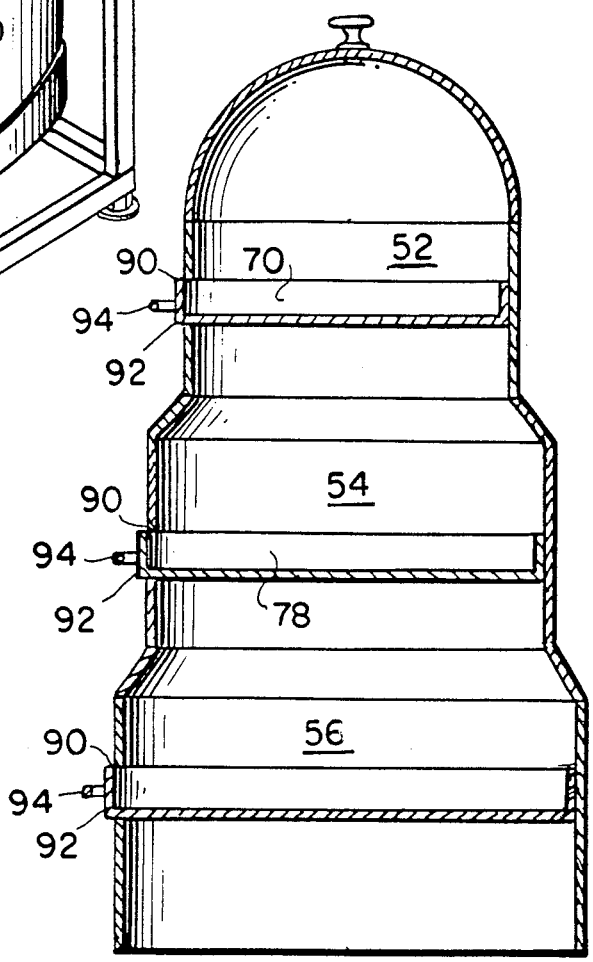
FIG. 8 illustrates a second embodiment of the present invention.

It should be noted that smoking of food takes a much longer time than grilling of food. Therefore, it is expected that if both grilling and smoking of food are to take place, one immediately after the other, smoking would take place first. With this in mind, the embodiment illustrated in FIG. 8 is best suited for easy removal of grill 70, water/wine pan 74, and heating element 78. Sections 52, middle section 54, and section 56 contain cut out areas 90, into which grill 70, water/wine pan 74, and heating element 78 fit, respectively. With this configuration, the grill 70, the water/wine pan 74 and the heating element 78 contain a partial surface 92 on one side that, when fully inserted, seals the opening 90 so that heat cannot escape. A handle 94 attached to the outer surface 92, allows quick and easy removal of each of the elements.

Thus, when switching from the smoking position to the grilling position using any of the embodiments, each of the elements are removed as recited above. The side braces 30 are removed, housing 50 is pivoted about pivot pin 66 so that section 56 is disposed on top, side braces 32 on top supporting member 22 are replaced, and heating element 78 is then reinserted. It should be noted that heating element 78 will fit into the same opening if the embodiment of FIG. 8 is used rather than requiring the support pins 76 and 86 illustrated in FIGS. 6 and 7.

Once the cooker 10 is in the position illustrated in FIG. 7, support pins 86 support a charcoal 88, and a grill 84 is placed at the top of section 56. Grill 84 is supported by the screws 64 attached through connecting plates 62 and section 56. Food is then placed on grill 84 and grilling commences. Cooker top 60 can be placed over section 56 if desired. It should be noted that if the sections 52, 54 and 56 have different diameters in the embodiment illustrated and cooker top 60 should have different tight fitting diameters for placement or grill 84 should be smaller, which is illustrated in FIG. 7 over both section 52 and section 58.

It should also be noted that a wok or a steamer is insertable in place of grill 84 so that other types of cooking, such as steaming, are useable when the cooker 10 is in the grill position. Also, with proper supporting members, the same grill can be used for grill 70 and grill 84.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

I claim:

1. A pivotable cooker for grilling and smoking food using a heating element comprising:
    an outer housing having sides, a first open end, and a second open end, said first and second open ends capable of being above each other when used for grilling and smoking food, respectively;

means for pivoting said housing so that one of said first and second open ends can be disposed above the other when used for grilling and smoking food, respectively;

means for collecting drippings from said food when said cooker is used for smoking food detachably attached to said housing to cover said first open end;

first means for supporting food when said cooker is used for smoking food disposed within said housing, nearer said second open end than said first open end;

second means for supporting said heating element within said housing;

third means for supporting food when said cooker is used for grilling food disposed nearer said first open end than second open end; and means for covering said second open end when said cooker is used for smoking food.

2. A cooker according to claim 1 wherein said pivoting means comprises:

a supporting frame including two pivot holes; and pivot pins projecting from said housing insertable into said pivot holes.

3. A cooker according to claim 2 wherein said supporting frame contains four legs, side braces and a top supporting structure.

4. A cooker according to claim 1 wherein said outer housing is made of a plurality of detachably connectable sections.

5. A cooker according to claim 4 wherein each of said sections are substantially cylindrical.

6. A cooker according to claim 5 wherein each of said sections, when disconnected, are capable of telescopically fitting inside each other.

7. A cooker according to claim 1 wherein said first means comprises first supporting pins and a first grill, said second supporting means comprises second supporting pins and a flat plate, and said third means comprises third supporting pins and a second grill.

8. A cooker according to claim 1 wherein said outer housing contains cut out portions into which said first, second and third means can be slidably inserted and wherein said first, second and third means each contain a side plate for covering said open portion.

9. A cooker according to claim 8 wherein said first, second and third means further comprises a handle attached to said side covering plate.

10. A cooker according to claim 1 wherein said cover further includes a thermometer.

* * * * *